US009378197B1

(12) United States Patent  
Ghanem

(10) Patent No.: US 9,378,197 B1  
(45) Date of Patent: Jun. 28, 2016

(54) STATISTICAL ANALYSIS METHOD FOR AUTOMATICALLY SELECTING A STATISTICAL ANALYSIS ALGORITHM BASED ON DATA VALUES AND INPUT PARAMETERS

(75) Inventor: George Khader Ghanem, New Albany, OH (US)

(73) Assignee: GMG HOLDINGS, LLC, Columbus, OH (US)

( * ) Notice: Subject to any disclaimer, the term of this patent is extended or adjusted under 35 U.S.C. 154(b) by 475 days.

(21) Appl. No.: 13/587,622

(22) Filed: Aug. 16, 2012

(51) Int. Cl.  
*G06F 15/00* (2006.01)  
*G06F 17/18* (2006.01)  
*G06F 17/24* (2006.01)

(52) U.S. Cl.  
CPC .................................. *G06F 17/246* (2013.01)

(58) Field of Classification Search  
CPC ......... G06F 19/16; G06F 19/14; G06F 19/00; G06F 15/00; G06F 17/18; G06F 101/14; G06F 9/45; G06F 17/246; G05B 11/32  
USPC .............. 715/219; 700/121, 110; 429/149, 61  
See application file for complete search history.

(56) References Cited

U.S. PATENT DOCUMENTS

| 6,492,989 | B1 | 12/2002 | Wilkinson | |
|---|---|---|---|---|
| 6,536,037 | B1* | 3/2003 | Guheen | G06F 8/71 703/2 |
| 6,549,864 | B1* | 4/2003 | Potyrailo | 702/81 |
| 7,023,453 | B2 | 4/2006 | Wilkinson | |
| 7,176,924 | B2 | 2/2007 | Wilkinson | |
| 7,627,432 | B2 | 12/2009 | Wilkinson | |
| 2002/0156597 | A1* | 10/2002 | Kornowski, Jr. | G01B 21/04 702/179 |
| 2003/0061212 | A1* | 3/2003 | Smith et al. | 707/6 |
| 2006/0184264 | A1* | 8/2006 | Willis et al. | 700/108 |
| 2007/0237383 | A1* | 10/2007 | Funk et al. | 382/144 |

OTHER PUBLICATIONS

Statistical Method for Semiconductor Manufacturing, Duane Boning et al. Encyclopedia of Electrical Engineering, J. G. Webster, Ed, Wiley, Feb. 1999.*  
JMP Version 10, "Quality and Reliability Methods", published by JMP, A Business Unit of SAS, SAS Campus Drive, Cary, NC 27513, published in Mar. 2012.*

* cited by examiner

*Primary Examiner* — Cesar Paula  
*Assistant Examiner* — Jian Huang  
(74) *Attorney, Agent, or Firm* — Standley Law Group LLP

(57) ABSTRACT

A statistical software package for manufacturing and business applications is disclosed. The software package comprises an improved user interface that supports data collection, entry, and analysis features for manufacturing and business applications. Data entry is simplified by prompting the user for no more data than is needed to perform calculations and analysis. The software completes complex data analysis, interprets the data in the background, and reports simple analysis results to the user about the data that has been entered. The software supports user conducted tests but decides which test or tests are appropriate test and which results are relevant for the user. In an example embodiment, the software package is implemented as a web-based application with a central database accessible through a web service to provide support to the user. In an example embodiment, the application provides data collection, data entry, analysis, interpretation, graphing, and reporting functionality.

18 Claims, 17 Drawing Sheets

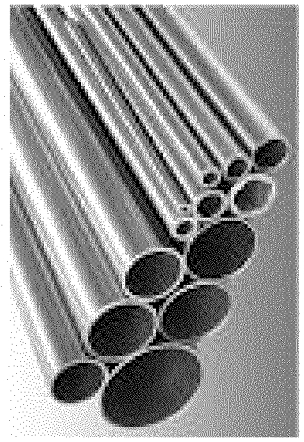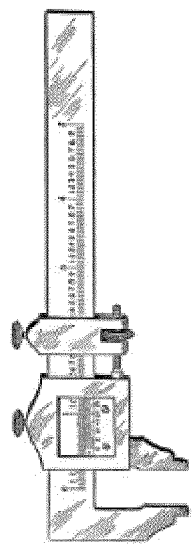
Figure 3

Figure 6A

| | | | | |
|---|---|---|---|---|
| | Enter Data | Collect Data | Analyze Data | Evaluate |

GMG Analyze and Interpret Data

| Pipe Diam |
|---|
| 2.00 |
| 2.10 |
| 1.30 |
| 1.80 |
| 1.70 |
| 2.20 |
| 2.40 |
| 1.30 |
| 2.10 |
| 2.50 |

| |
|---|
| 1.Time |
| •Hour |
| •Shift |
| •Day |
| •Week |
| •Quarter |
| 2.Location/position |
| •Top to bottom or side to side |
| •Mold cavity |
| •Individual testers |
| •Orientation of unit |
| 3.Environment |
| •Temperature |
| •Humidity |
| •Barometric pressure |
| 4.Operator |
| •Training |
| •Experience |
| •Skill |
| •Name |
| 5 Plant |
| •Machine |
| •Tool |
| •Plant |
| •Cell |
| •Fixture |

Figure 10C

Questions by Algorithm

| ALGORITHM / QUESTION | | Analyze Continuous | Analyze % Defective | Analyze Defects per Unit | Compare Continuous | Compare % Defective | Compare Defects per Unit | Chi-Sqr, 2-Way Tables | Relate |
|---|---|---|---|---|---|---|---|---|---|
| Individual variable analysis | Q1 | X | X | X | | | | | |
| Multi-Vari analysis | Q1 | | | | X | X | X | X | X |
| Continuous Data | Q2 | X | | | X | | | | |
| % Defective data | Q2 | | X | | | X | | | |
| Defect per unit data | Q2 | | | X | | | X | | |
| Can outliers be removed? | Q3 | X | | | | | | | |
| Subgroup size? | Q4 | X | | | | | | | |
| Spec Limits? | Q5 | | | | | | | | |
| Number of independent variables? | Q6 | | | | X | | | | |
| Number of groups? | Q7 | | | | X | X | X | | |
| Target value? | Q8 | X | | | X | | | | |
| Defect or defective Column? | Q9 | | X | X | | X | X | | |
| Total units tested column? | Q10 | | X | X | | X | X | | |
| Dependent vs. Independent? | Q11 | | | | | | | X | X |
| With replacement? | Q12 | | | | | | | X | |
| Dependent or response variable Y? | Q13 | | | | | | | X | X |
| 2-way Tables? | Q14 | | | | | | | X | |
| Significance Level? default =0.05 | Q15 | X | X | X | X | X | X | X | X | questions to investigate:
number of replicates for compare
with 2- factors

Figure 11

STATISTICAL ANALYSIS METHOD FOR AUTOMATICALLY SELECTING A STATISTICAL ANALYSIS ALGORITHM BASED ON DATA VALUES AND INPUT PARAMETERS

CROSS-REFERENCE TO RELATED APPLICATIONS

None.

BACKGROUND OF THE INVENTION

Many business management strategies strive to improve the quality of process outputs by identifying and removing the causes of defects or errors and minimizing variability in the manufacturing and business processes. The strategies often use a set of quality management methods, including statistical methods, and suggest creating a special infrastructure of people within the organization (e.g., "Black Belts," "Green Belts," etc.) who are experts in these methods. Projects in the organization may be carried out according to a method and follow a defined sequence of steps toward a specified goal (e.g., a quantified manufacturing tolerance).

Although application of statistical methods to manufacturing and business processes is known to be an effective way to achieve improvements, learning and developing appropriate skills in the application of statistical methods requires patience and diligence. Because manual and human-based decisions are the centerpiece of today's art, proficiency in application of statistical methods for manufacturing and business requires not only an understanding of statistical concepts, methodologies, and calculations but mastery of the statistical analysis software packages that are used for calculation of statistics. For many individuals, mastery of statistics fundamentals is further complicated by the required mastery of the software packages. One of the reasons statistical software packages are difficult even for organizational experts to master is that the interfaces are cumbersome and non-intuitive. They often rely on hundreds of hierarchical menus and submenus that a user must review to set appropriate parameters or to select the appropriate tool. Some packages provide wizards for a few, but not all, of the available tools. Because no wizards are provided for important tools such as nonparametric hypothesis testing and nonlinear regression tests, existing packages are not very useful for manufacturing and business applications. While many statistical software packages are feature-rich and very powerful, they provide far more functionality than is needed for many manufacturing and business applications and therefore, are very difficult to use. In addition, for many unskilled users in statistics, they do not support automated statistical methods that are important for manufacturing and business process statistical analysis. There is a need for a statistical software package directed to mainstream, unskilled users in statistics for manufacturing and business applications with an intuitive, automated and improved user interface. There is a need for a statistical software package with an interface that allows users unskilled in the art of statistics to produce high quality statistical and data analysis with minimal user input.

SUMMARY OF THE INVENTION

The present disclosure is directed to a statistical software package for manufacturing and business applications. The software package comprises an improved user interface that supports data collection, entry, and analysis features for manufacturing and business applications. Data entry is simplified by prompting the user for no more data than is needed to perform calculations and analysis. The software completes complex data analysis, interprets the data in the background, and reports simple analysis results to the user about the data that has been entered. The software supports user conducted tests but decides which test or tests are appropriate and which results are relevant for the user. In an example embodiment, the software package is implemented as a web-based application with a central database accessible through a web service to provide support to the user.

In an example embodiment, the application provides the following functionality:

TABLE 1

| | Application Functionality |
|---|---|
| Data Collection: | Prepares data collection sheet for the user to collect data for various tests and analysis with correct sample sizes and power of test |
| Data Entry: | Spreadsheet format that allows data to be imported or inputted manually |
| Analyses: | uses raw data to check variables for stability and then conducts various statistical analyses (including descriptive statistics, process performance capability, differences and associations between variables or processes), selects correct tests, tools and methods using system criteria and algorithms to collect baseline statistics and store in database |
| Interpretation: | Uses algorithms and system rules to interpret the stored results |
| Graphing: | Graphs are generated automatically and accompany analyses based on the tests that are executed |
| Reporting: | Analysis and interpretation are presented in a generated report; system presents an interactive display of the analysis with graphics to describe the data/process |
| Evaluating: | User may evaluate the process at suggested values |

BRIEF DESCRIPTION OF THE DRAWINGS

FIG. 3 is an illustration for an example pipe diameter analysis according to an example embodiment;

FIGS. 6A-6B are sample data analysis screens according to an example embodiment;

FIGS. 10A-10C are sample data collection elements for single and multiple variable analysis according to an example embodiment;

FIG. 11 lists variable definitions according to an example embodiment; and

DETAILED DESCRIPTION

Figure 1:
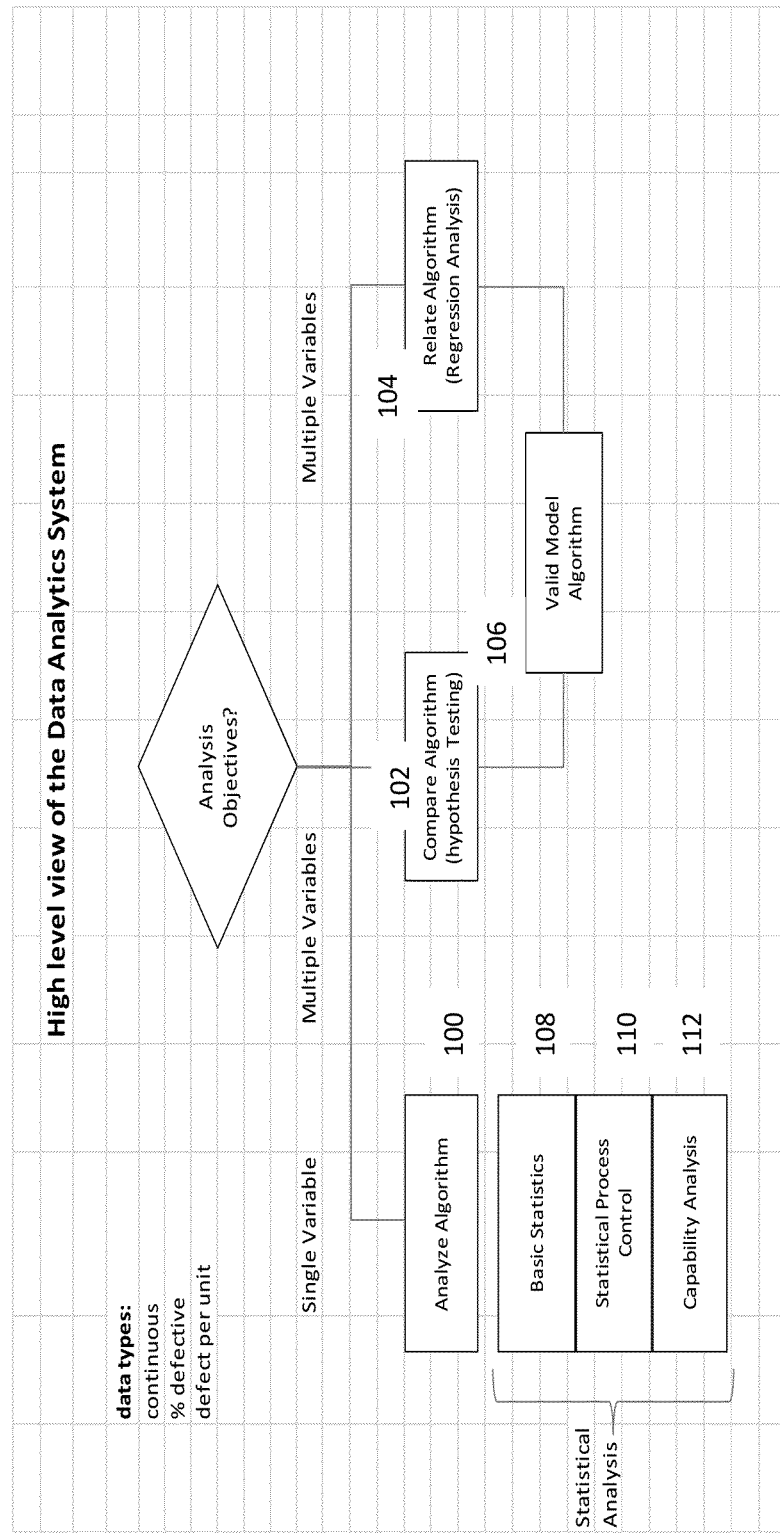
FIG. 1 is a flow diagram of a data analytics system according to an example embodiment.

Referring to FIG. 1, a flow diagram of a data analytics system according to an example embodiment is shown. In an example embodiment, the system comprises four primary algorithms: analyze algorithm 100; compare algorithm (for both differences and associations between variables) 102; relate algorithm (for both observed and controlled experiments) 104; and valid model algorithm 106. The algorithms represent the most common statistical analyses used for quality improvement and data analysis. The analyses apply to both individual and multiple variable studies. In an example embodiment, a web-based software application may be used to analyze products and services outputs across numerous industries. Based on minimal user input, the system continually pares down the tool choices and eliminates tools that are not needed to move from general-to-specific tool selections for particular process data. The tool choices and data checks are made continuously without user involvement for each algorithm. Prior art methods typically require an experienced practitioner to perform a step-by-step analysis in which the results are verified and interpreted one at a time.

The analyze algorithm 100 evaluates whether a process is capable of producing products or services that meets customer or other requirements. In an example embodiment, the analyze algorithm includes three mainstream statistical analysis methods to examine a single variable process data. These methods are:

TABLE 2

Analyze Algorithm Statistical Analysis Methods

| | |
|---|---|
| Basic statistics 108 | Evaluates process average, variation and shapes of data |
| Statistical Process Control 110 | Evaluates whether a process is stable and consistent (no special issues present in the process) |
| Capability Analysis 112 | Evaluates capability based on a single process variable to assess the percent defective rate of the process (the percentage of products or services that fail to meet customer or other specifications) |

To accurately estimate capability analysis of a process, the system examines conditions that can affect the validity of the results. To accomplish this, the system automatically performs several data checks as follows: (1) Does the data come from a stable process (e.g., does the data have any points outside of the control limits and is there a mean shift in the data)?; (2) Because the analysis estimates the capacity statistics based on normal distribution, does the process data follow a normal distribution (bell-shaped data with no outliers)?; and (3) Is the sample size large enough and is there enough data to accurately estimate the statistics? In an example embodiment, the software package automatically performs the following tests on the process data and presents these results in a summary report: 1) Does the data come from a normal distribution?; 2) Is the process stable and consistent?; and 3) Is the sample size large enough to estimate the statistics accurately?

Figure 2:
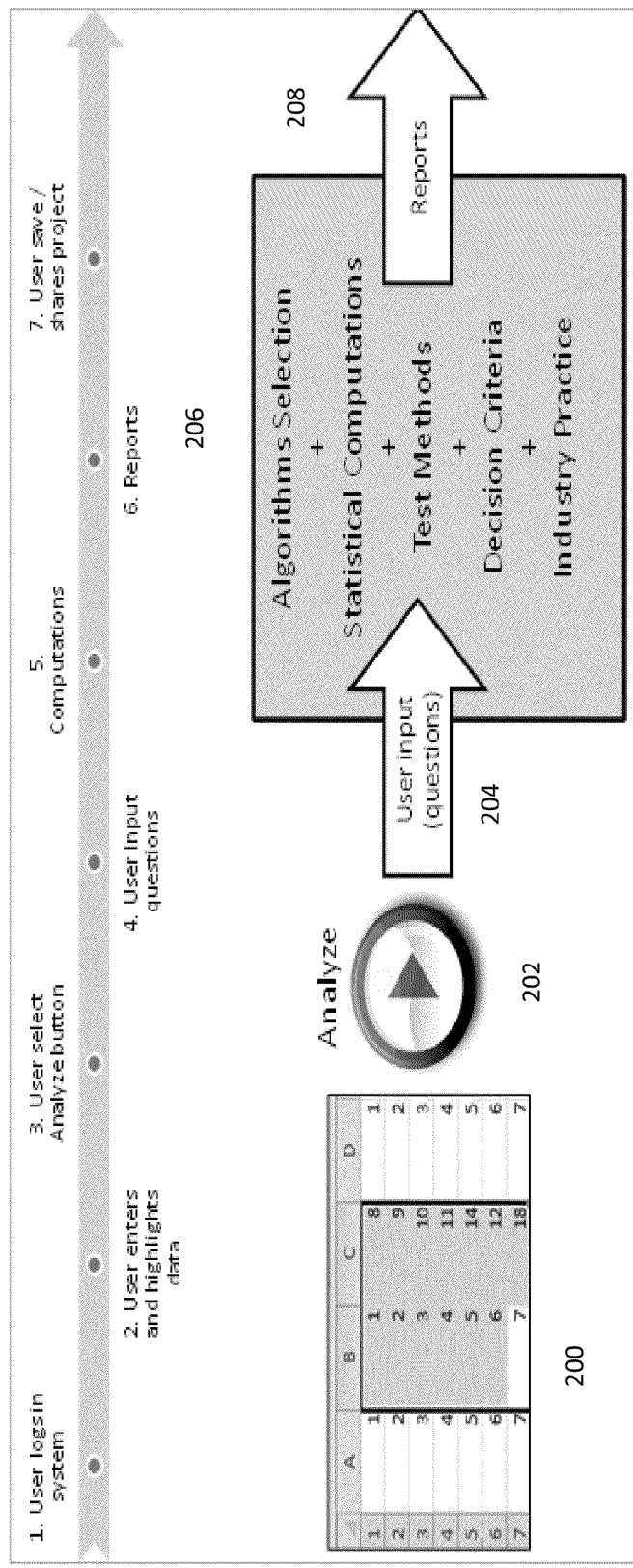
FIG. 2 is a high-level work flow diagram according to an example embodiment.

Referring to FIG. 2, a high-level work flow diagram according to an example embodiment is shown. The high-level process comprises the following steps. First, the system utilizes the input from the user 200 to select the appropriate algorithm from the four main algorithms 202. Second, the selected algorithm utilizes limited user input and built-in decision criteria to select the appropriate statistical analysis procedures to evaluate process data 204. The analysis is conducted in the background and not visible to the user. Third, the selected algorithm utilizes the statistical output from the analysis and compares it with the built-in decision criteria to establish next steps in the flow 206. The system continues the approach until it completes all necessary phases of the algorithm. Fourth, the system summarizes the findings and results in an easy-to-understand report using high quality graphics 208.

Referring to FIG. 3, an illustration for an example pipe diameter analysis according to an example embodiment is shown. In the example, the analyze algorithm is applied to measured data (meaning an instrument was used to collect the data). For this example, data was collected and measured at the same time using a calibrated set of calipers. Two-inch metal pipes are manufactured with an acceptable customer specification of ±0.1 inches. A concern is identified regarding the consistency of the diameters to meet customer specifications and the high scrap rate in the process. The goal is to determine how many pipes are out of specification and being scrapped. Using the calipers, 10 finished pieces of pipes are measured from the process and the readings are documented to conduct the analysis. In this example, the sample size is small to simplify the explanation.

Figure 4:
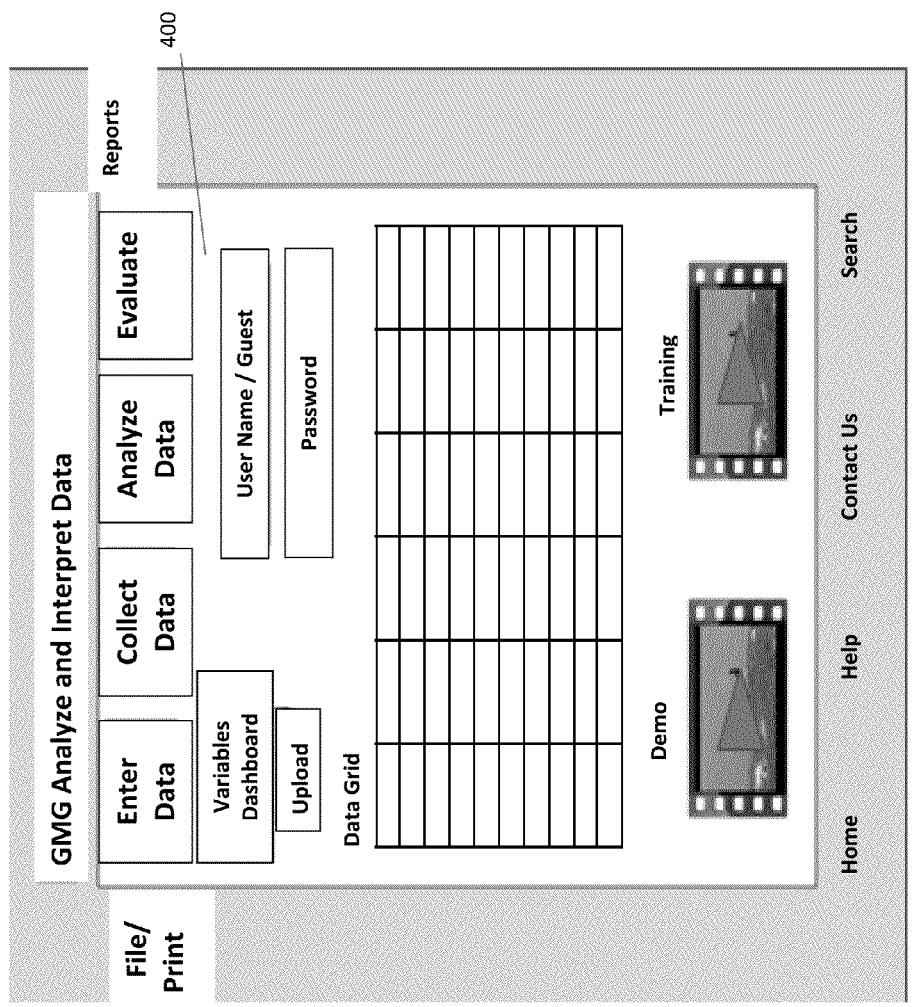
FIG. 4 is a sample login in screen according to an example embodiment.
Figure 5:
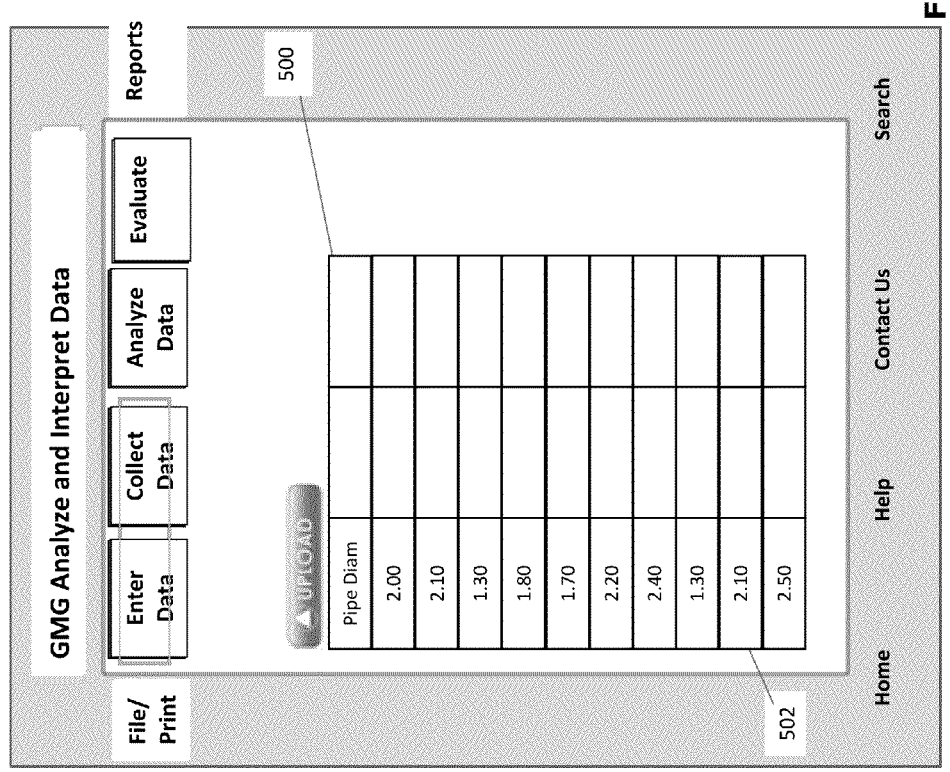
FIG. 5 is a sample data entry screen according to an example embodiment.

Referring to FIG. 4, a sample login screen according to an example embodiment is shown. A user access a web site where the software application executes and enters login data 400. Referring to FIG. 5, a sample data entry screen according to an example embodiment is shown. In an example embodiment, the software supports data entry in a spreadsheet format that allows data to be imported or entered manually. In the pipe diameter example, the user enters pipe diameter data in the grid 500 by uploading the data from a file or manually keying in the data. The user then highlights the column(s) of interest for analysis. In this example, one column is shown for the pipe diameter 502. The system repeats the analysis if two columns or more are selected.

Figure 6B:
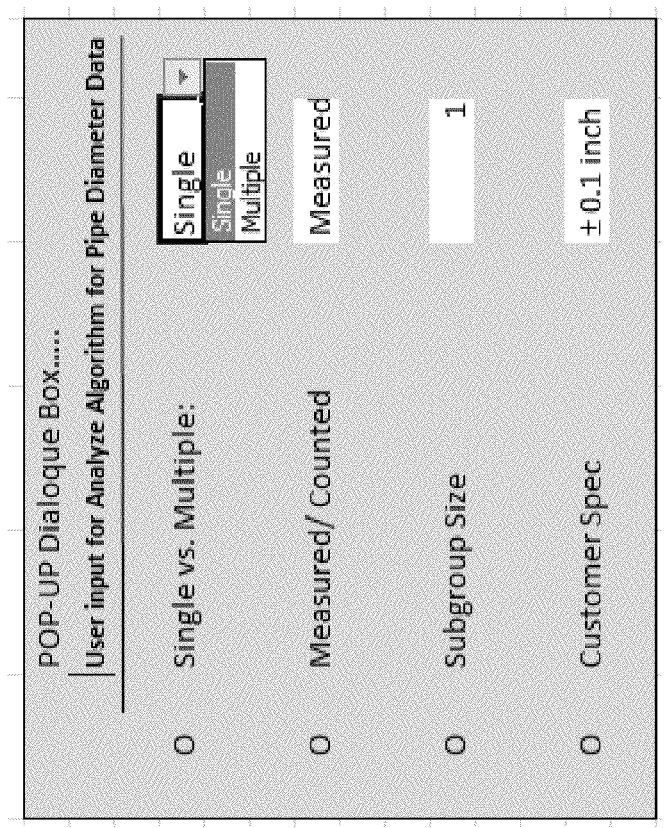

Referring to FIGS. 6A-6B, sample data analysis screens according to an example embodiment are shown. Referring to FIG. 6A, the user selects the "analyze data" option 600 which causes an input dialogue box to appear as shown in FIG. 6B (the dialogue box can also be affixed to the side of the screen). In the dialogue box, the user is prompted for input to define the variables and process data for the software. In an example embodiment, the user is prompted to answer a few multiple-choice questions from a drop-down menu or to input numeric data. For the multiple-choice questions, the user may select one of two options depending on process data. These questions assist the software in paring down the analysis tools, methods, and choices and in eliminating analyses that are not applicable. The software continually pares down choices until it reaches the appropriate algorithm, tests, and analyses. For the pipe diameter example, user inputs (answers to the prompts) are shown in Table 3. FIG. 11 provides a list of user input questions to support other algorithms.

TABLE 3

Expanded View of User Input Questions

| User Input Questions | User Input Answer 1 | OR User Input Answer 2 | Explanation |
|---|---|---|---|
| Is this a single or multiple variable analysis? | Single | Multiple | If user selects "single," the system eliminates multiple analysis and focuses on single analysis to conduct basics statistics, statistical process control, and capability analysis. If multiple, it adds regression and hypothesis testing. |
| Was the data measured with an instrument or was it counted? | Measured | Counted | If user selects "measured," the system ignores discrete algorithm analysis and activates the measured data algorithm for the analysis. If user selects "counted," the discrete data algorithm is activated for the analysis. |
| Were all samples collected at the same time or how many data points were collected each time (subgroup size)? Subgroup size is the number of data points measured at the same time. | All data points collected at the same time | 1-7 OR ≥8 pieces collected at the same time | If user selects "all collected at the same time," this activates the individual and moving range (I-MR) statistical process control chart and analysis. Between 1-7 activates the Xbar-Range chart and ≥8 actives the Xbar-Standard deviation chart |
| What are the acceptable customer specifications for this product or service (tolerance)? | ±0.1 | None | If user inputs a value, this response activates the measured capability algorithm to conduct the capability analysis. If user does not provide a value, the system eliminates capability analysis and presents basic statistics and process statistical control analysis only. |

Figure 7:
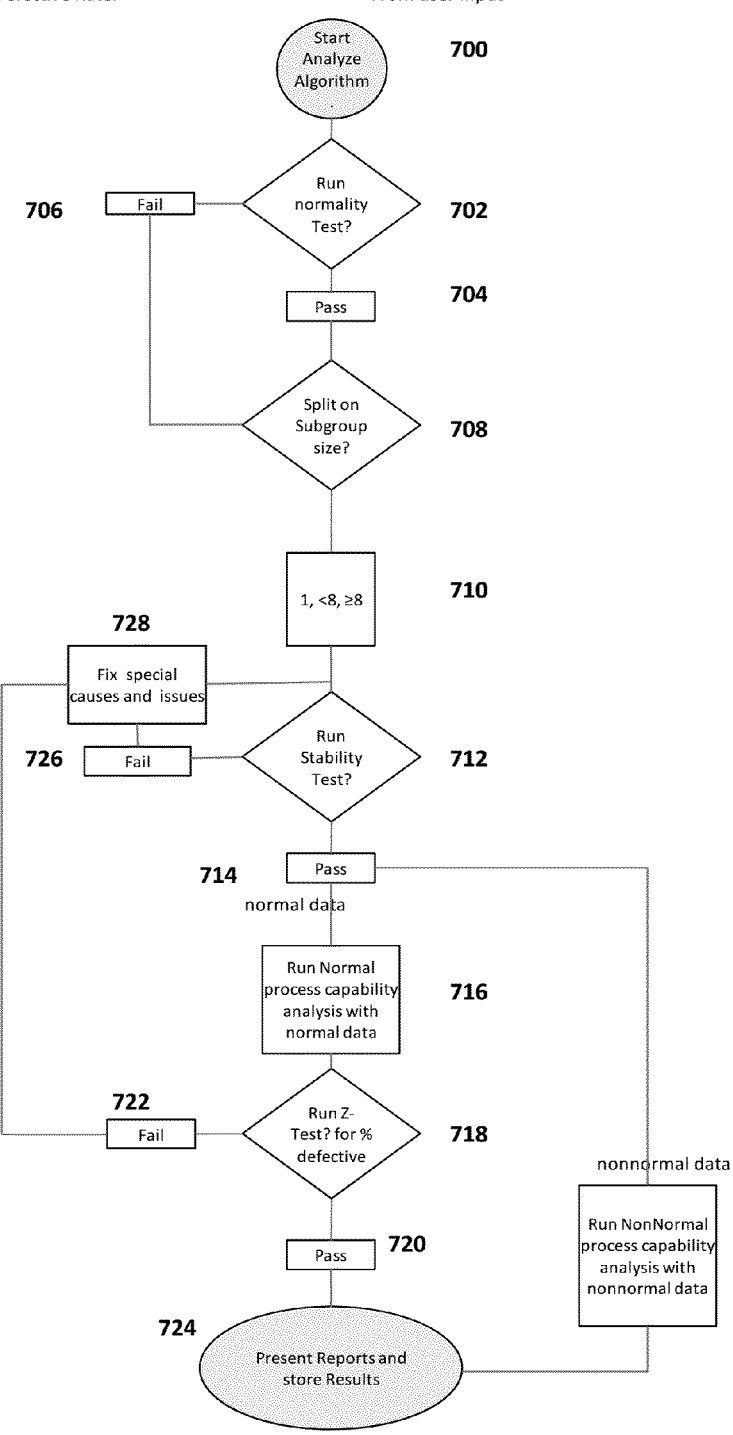
FIG. 7 is a measured data analyze algorithm according to an example embodiment.

The software next activates the measured data analyze algorithm based on the user inputs above. Referring to FIG. 7, a measured data analyze algorithm according to an example embodiment is shown. The software analyzes a single continuous variable 700 by initially conducting a normality analysis 702 on the data in the background and comparing the test statistic—in this case the p-value (the test for pass or fail) 704—to the built-in system criteria for the same statistic (p-value=0.05). This test determines whether there is a need to conduct a normal or non-normal capability analysis. Normal data follows a bell shaped curve and is not skewed in either direction. Data is normal if the test criteria p-value >0.05 704 and data is non-normal if the p-value <0.05 706. In that case, non-normal capability analysis is used.

Figure 8A:
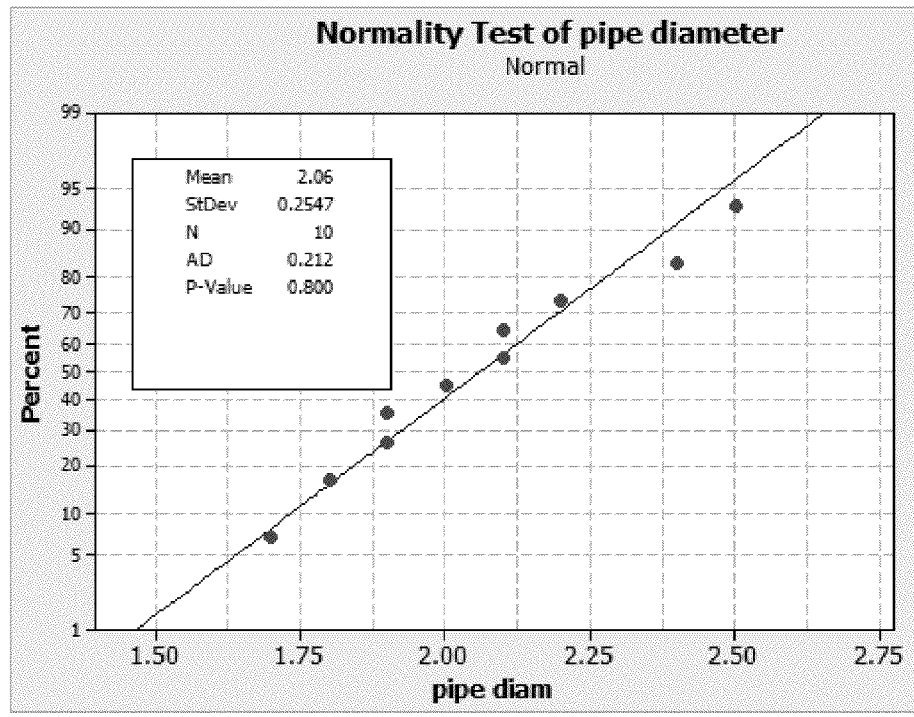
FIGS. 8A-8C are sample graphs according to an example embodiment.

Referring to FIG. 8A, a sample graph of normality test results is shown. The graph shows the results after the software executes statistical analysis for a normality test and generates the criteria for algorithm to compare to its built-in decision criteria. In this case, p-value for pipe diameter=0.8 which is >0.05 indicating the data comes from a normal distribution and system can use normal capability analysis.

Referring again to FIG. 7, the software follows different branches 710 depending on the subgroup size 708. In the example, the subgroup size is one because all data was collected at the same time under similar conditions. The software conducts a stability test 712 to make sure the process is stable (i.e., does not vary greatly) and it does not have unusual causes for variation. To do that, the software conducts two tests. In a first test, the software identifies points outside of the control limits (i.e., points >3 standard deviations from the centerline). The test fails if one point falls outside the specified limits. The second test helps detect common out-of-control situations and improves the ability of the chart to detect small shifts in the mean. The second test also increases sensitivity enough to warrant a slight increase in the false alarm rate. The test fails when nine or more points are on one side of the centerline (shift in the mean). If either of these tests fails, the software indicates the failure (e.g., by show a red point marked with either number 1 or 2 signifying the failed test) 726. In the pipe diameter example, the process is stable. If the tests fail, the user needs to use caution when interpreting the capability analysis because the process is out-of-control and needs to be corrected 728.

Figure 8B:
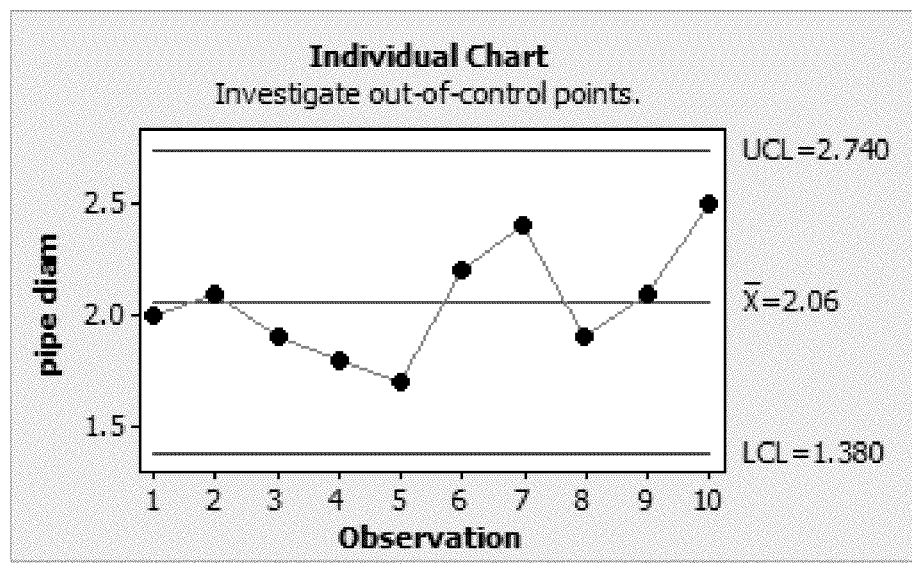

Referring to FIG. 8B, a sample graph of process control test results is shown. The process control test output is displayed after the software executes the statistical analysis for the process control test and generates the criteria for the algorithm to compare to its built in decision criteria. In this example, no points fell outside the control limits, indicating the process is in control and the system can proceed with capability analysis without restrictions or alarms.

Referring again to FIG. 7, because the process is normal and stable 714, the software proceeds to calculate the percent defective rate in the process 716 (i.e., number of units out of specification). In an example embodiment, if the data is normal and stable, the software executes a normal capability analysis. Otherwise, the software executes a different analysis such as the Weibull for non-normal capability analysis.

Figure 8C:
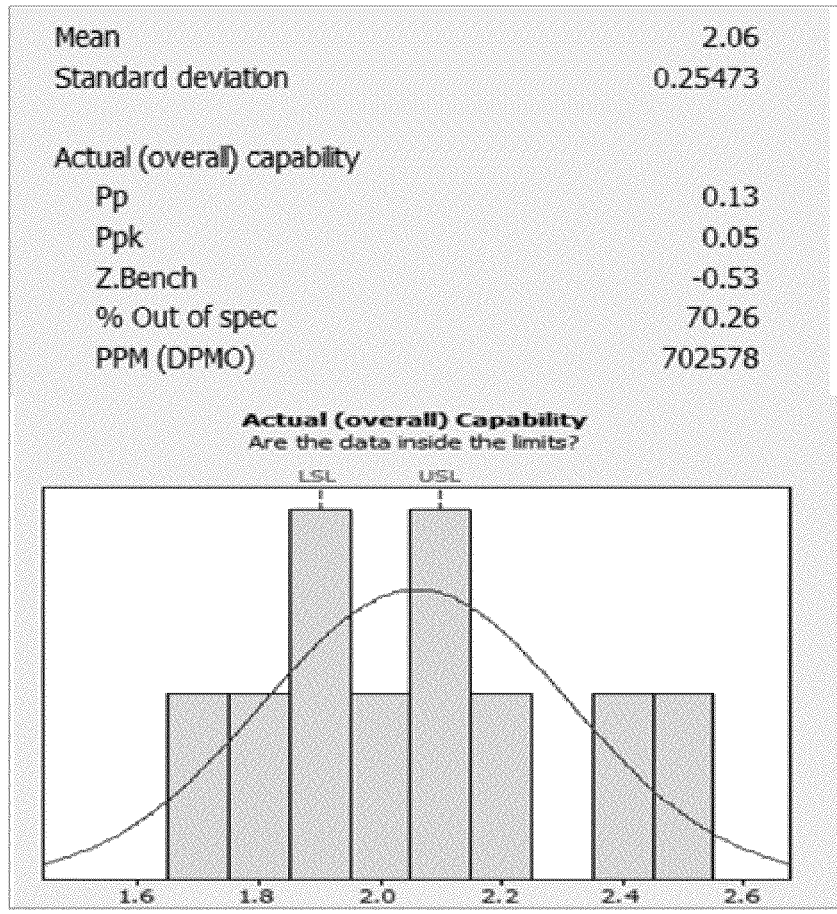

Referring to FIG. 8C, a sample capability analysis graph with normal data is shown. The normal capability analysis output is displayed after the software executes the statistical capability analysis and generates the criteria for the algorithm to compare to its built-in decision criteria. In this case, z-score for pipe diameter=−0.53 which is <3 indicating the data produces large number of defects (7/10 units are out of spec). The conclusion is that the manufacturing process needs to be improved.

Referring again to FIG. 7, the software next computes the key capability indices such as Pp/Cp (process consistency), Ppk/Cpk (process precision, meeting a goal or a target), PPM (parts per million), average, mean, standard deviation (measures variation in the process), interquartile range (measures variation for non-normal data), z-score (process capability metric that depends on PPM value), and defective rate percentage (amount of pipe outside the spec limit) 718. If the process z-score ≥3, the process may be improved slightly 720. If the process z-score is <3, the process needs substantial improvement 722. The system stores these metrics in the database for later use 724. The software further presents a summary of the analysis in the reports.

Figure 9:
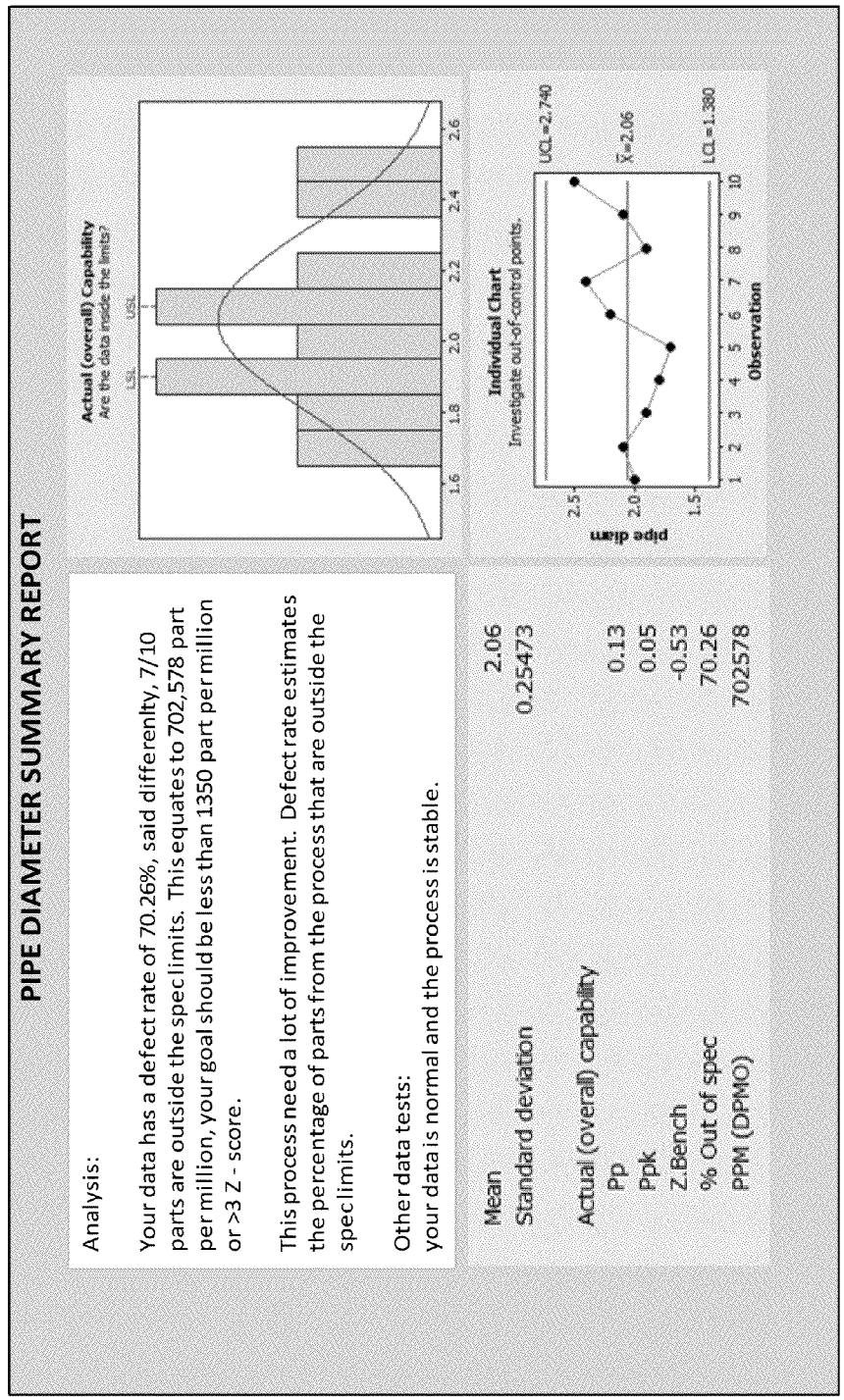
FIG. 9 is a sample summary report according to an example embodiment.

Referring to FIG. 9, a sample summary report according to an example embodiment is shown. The report comprises a summary of the analysis and graphs. The user may customize the reports or use the hyperlinks as needed to view additional details of the analysis.

Figure 10A:
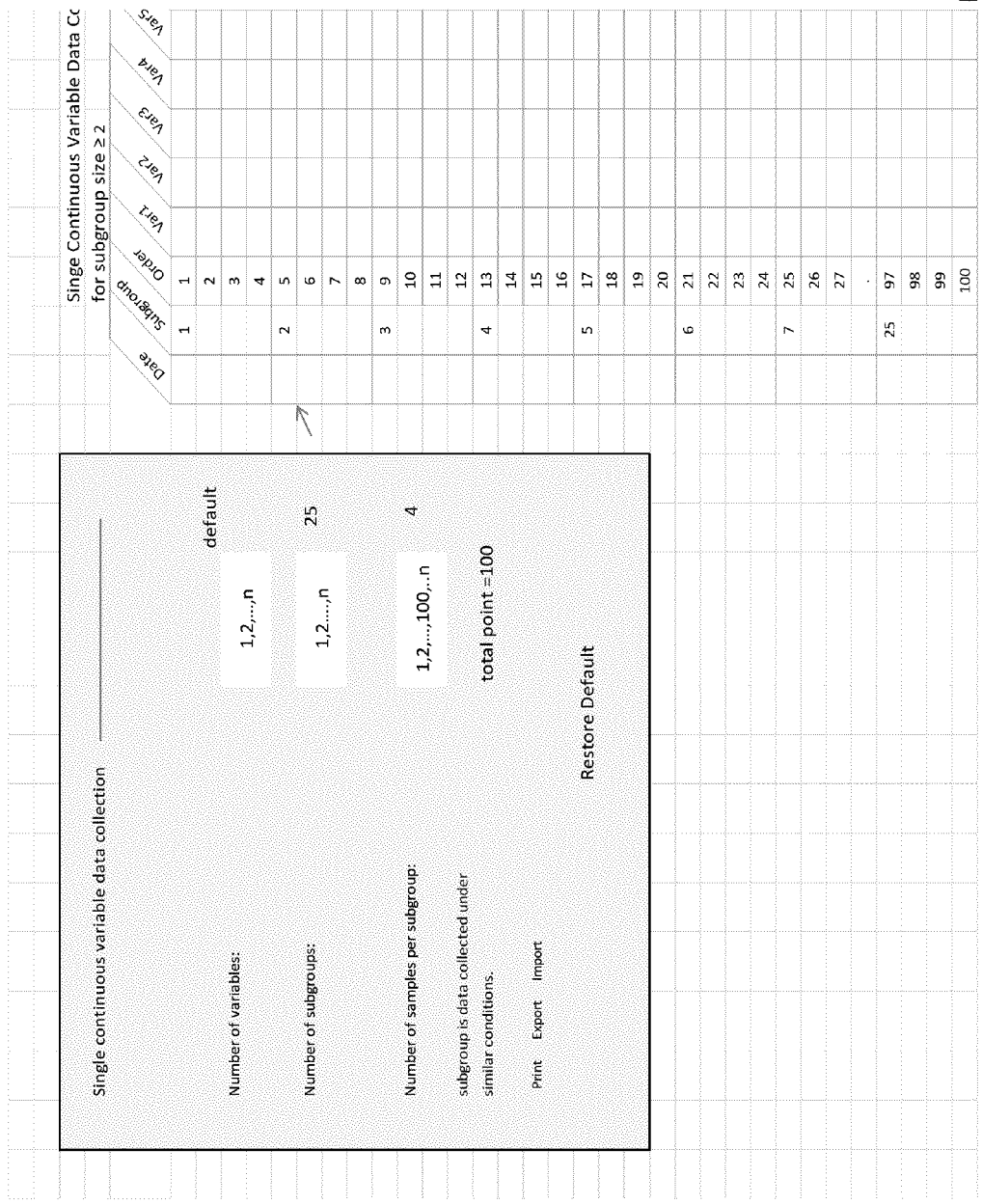
Figure 10B:
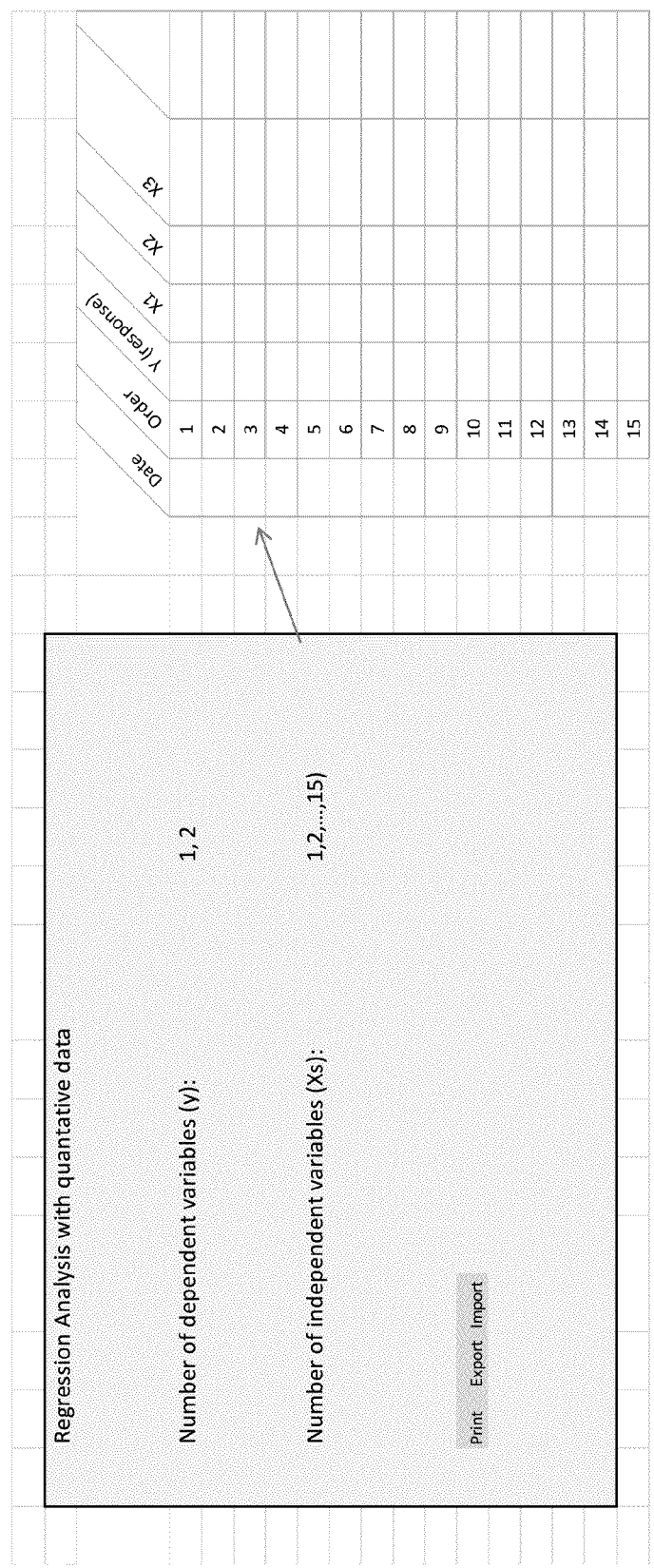

FIG. 10A, a sample data collection elements for a single variable analysis according to an example embodiment is shown. FIG. 10B, shows similar elements for multiple variable analysis according to an example embodiment. The multiple variable analysis data collection elements support regression and hypothesis testing. Referring to FIG. 10B, the multiple variable data collection sheet comprises an editable column for each X variable and each Y variable. Sample size recommendations are built into the test and methods and system will alert users any time the sample sizes are inadequate.

For data collection with subgroups, the recommended subgroup size is eight data points (meaning eight samples per subgroup collected under similar conditions) which increases the precision of the analysis, and the subgroup options are as shown in FIG. 10C. As with single variable analysis, after the data is entered in the spreadsheet, dialogue boxes guide the user to define the variables.

User input questions and variable definitions according to an example embodiment are shown in Table 4. User input questions appear based on the selected test. When information about variables is entered or collected from analysis, the system retains that information even if the column moves. Hyper-dynamic text is used to define these terms as the mouse or other input device hovers over them.

TABLE 4

User Input Questions

| Question # | Question for User Input for the Algorithms to Execute | Algorithm | Default/Auto Detect/User input | User Input |
| --- | --- | --- | --- | --- |
| Q1 | Individual (s) vs. Multi-variable analysis? | Analyze | Individual (Analyze - basic statistics, Statistical Process Control, Capability) | Multiple-variable (Compare/relate) |
| Q2 | Type of Data? | Analyze | Continuous data (measured) | (% Defective or Defects per Unit, 2-way tables) (Counted) |
| Q3 | Can outliers be removed? | Analyze, Relate | Yes: Outlier are explainable | No: Outlier are natural to the process |
| Q4 | Subgroup size? | Analyze | 1, or <8 or ≥8 (Analyze algorithm and SPC charts) | |
| Q5 | What are the Spec limits? | Analyze (upr, lwr, or both) | | USL and or LSL (capability analysis, SPC) |
| Q6 | Number of independent variables? | Compare | User input | To establish 2-way ANOVA, or 2-way tables |
| Q7 | Number of Groups? | Compare | 1 (compare, chi-sqr) | 2, 3+ (compare, chi-sqr) |
| Q8 | What Target/Acceptance value for test? This is optional at times. | Compare | User input (compare, capability) | User input (compare, capability) |
| Q9 | Which column (C1, C2) contains the Defects or defectives | Compare | User selection (discrete analysis for compare, capability) | |
| Q10 | Which column contains Total units tested | Compare | User selection (this this auto selected once user selects (C1 or C2 from item above) | |
| Q11 | Are the variables Dependent (correlated) or Independence? | Compare | Independent (compare) | Dependence compare as in pair-t, or relate as in Y = f(x)) |
| Q12 | Sample with replacement | Analyze % defective | Without replacement | Without replacement |
| Q13 | When, multiple columns are selected, which column is the dependent response variable Y? | Relate | Note: once user selects the column, the systems assumes the other variables are independent X(s) | User input (Relate, 2-way tables, 2-way ANOVA) |
| Q14 | Column selected are 2-way Table? | Chi-Sqr, Compare | Yes (Compare chi-square) | No (compare) |

TABLE 4-continued

User Input Questions

| Question # | Question for User Input for the Algorithms to Execute | Algorithm | Default/Auto Detect/User input | User Input |
|---|---|---|---|---|
| Q15 | Alpha level Significance of the test | All | α = 0.05, with 95% C.I. | User could change default alpha based on industry |

Referring to FIG. 11, the variables definition dialogue boxes provide input to the system which allows it to select the appropriate algorithm for the analysis. Data collection sheets are generated for the appropriate process and the user provides input as appropriate to execute regression or hypothesis testing analysis. For example, to compare groups, the user is prompted for the number of groups to be compared. As with the single variable analysis, the analyze phase begins when the user selects the analyze option and the software proceeds with little interaction from the user.

Referring again to FIG. 10A, after completing the variable definition and entering the variable specifications, the user may select any column(s) of the data collection sheet for analysis and then select the analyze option. In the case of comparison or relationship (hypothesis and regression), after the user selects the columns for analysis, he is prompted to select the hypothesis (compare) or regression (relate) option.

The flow diagram in FIG. 7 is a representative example of an analyze algorithm for a single variable according to an example embodiment. Similar methods and algorithm workflows are used for multiple variable evaluations. As indicated in FIG. 7, a user may be prompted to provide input at various points based on the user input questions outlined in Table 4 and FIG. 11. Otherwise the software proceeds with the analysis based on the built in decision criteria and workflow.

Figure 12:
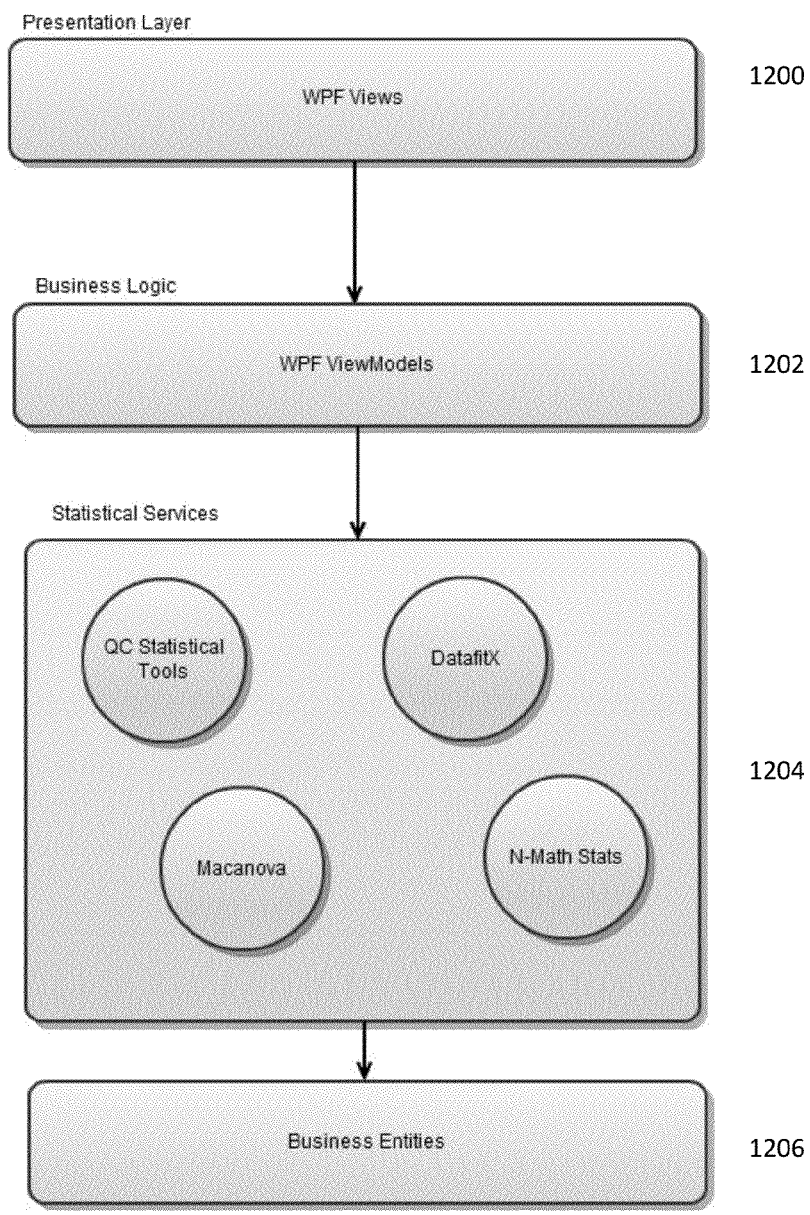
FIG. 12 is a system architecture diagram of a software application according to an example embodiment.

Referring to FIG. 12, a system architecture diagram of a software application according to an example embodiment is shown. As indicated in FIG. 12, the software application may comprise a presentation layer 1200, business logic 1202, statistical services 1204, and business entities 1206. The presentation layer 1200 and business logic layer 1202 may be implemented using Microsoft® Windows® Presentation Foundation development tools.

Statistical services 1204 may be provided using integrated software components as indicated in Table 5.

TABLE 5

Statistical Components

| Component | Services |
|---|---|
| Regression | Basic Statistical information about a series Regression analysis (linear, nonlinear, single and multivariate) |
| Statistical Process Control | SPC (Variable, Attribute, and SPC tests) Capability Analysis (linear, nonlinear) |
| Hypothesis Testing | Hypothesis Testing (1 Sample, 2 Sample, Parametric, Nonparametric, ANOVA >3, Chi Squared) |
| Design of Experiments | DOE (linear, nonlinear) |

The interface of the disclosed statistical analysis system and method allows many users unskilled in the art of statistics to produce high quality statistical and data analysis with minimal user input. While certain embodiments of the disclosed statistical analysis software system and method are described in detail above, the scope of the invention is not to be considered limited by such disclosure, and modifications are possible without departing from the spirit of the invention as evidenced by the claims. For example, elements of the user interface and analysis reporting may be varied and fall within the scope of the claimed invention. Various aspects of data entry and analysis may be varied and fall within the scope of the claimed invention such as design of experiments, gage studies, logistic regression and the like. One skilled in the art would recognize that such modifications are possible without departing from the scope of the claimed invention.

What is claimed is:

1. A computerized method for calculating at least one statistic for a process comprising:
    (a) displaying at a computer a data collection sheet for receiving a plurality of data values for a process;
    (b) receiving at said computer a user data entry selection to enter in said data collection sheet said plurality of data values;
    (c) receiving at said computer and entering in said data collection sheet said plurality of data values according to said user data entry selection;
    (d) receiving at said computer a user selection of a subset of said plurality of data values in said data collection sheet;
    (e) in response to receiving said user selection of said subset of said plurality of data values, presenting to said user at said computer:
        (1) a first analysis prompt if said subset corresponds to a single column of said data collection sheet; and
        (2) a second analysis prompt if said subset corresponds to multiple columns of said data collection sheet;
    (f) in response to receiving at said computer said user selection of said first or second analysis prompt, prompting for and receiving from said user a plurality of additional input parameters corresponding to said user selection;
    (g) automatically selecting at said computer a statistical analysis algorithm according to:
        (1) said subset of said plurality of data values; and
        (2) said additional input parameters;
    (h) executing at said computer said selected statistical analysis algorithm to calculate at said computer at least one statistic for said subset of said plurality of data values; and
    (i) generating at said computer for display at a user device a screen comprising said at least one statistic.

2. The computerized method of claim 1 wherein said statistic is selected from the group consisting of:
    data average, data variation, and 95% confidence boundaries.

3. The computerized method of claim 1 wherein said selected statistical analysis algorithm is a measured data algorithm to complete at least one statistical process control analysis.

4. The computerized method of claim 3 wherein said statistical process control analysis is a stability analysis.

5. The computerized method of claim 1 wherein said selected statistical analysis algorithm is a measured data algorithm to complete at least one capability analysis.

6. The computerized method of claim 5 wherein said capability analysis comprises an out-of-specification percentage, a process repeatability statistic, a process precision statistic, and a process overall performance statistic.

7. A computerized method for calculating at least one statistic for a process comprising:
   (a) displaying at a computer a data collection sheet comprising a plurality of data values for a process;
   (b) receiving at said computer a user selection of a subset of said plurality of data values comprising at least two columns from said data collection sheet;
   (c) in response to receiving at said computer said user selection of said subset of said plurality of data values, presenting to and prompting said user to select a multiple variable analysis option;
   (d) receiving at said computer a user selection of a measured or counted variable option;
   (e) receiving at said computer a user selection of a sample collection option;
   (f) receiving at said computer a tolerance value for said subset of data values;
   (g) automatically selecting at said computer a data algorithm according to:
      (1) said subset of said plurality of data values;
      (2) said selected measured or counted variable option;
      (3) said sample collection option; and
      (4) said tolerance value;
   (h) executing at said computer said data algorithm to calculate at said computer at least one statistic for said selected, multiple variable, subset of data values; and
   (i) generating at said computer for display at said computer a screen comprising said at least one statistic.

8. The computerized method of claim 7 wherein automatically selecting at said computer a data algorithm comprises selecting a measured data algorithm if a measured variable option is selected.

9. The computerized method of claim 7 wherein automatically selecting at said computer a data algorithm comprises selecting a discrete data algorithm if a counted variable option is selected.

10. The computerized method of claim 7 wherein said sample collection option is selected from the group consisting of:
   samples selected at the same time and samples collected at different times.

11. The computerized method of claim 7 wherein said statistic is selected from the group consisting of:
   data average, data variation, and 95% confidence boundaries.

12. The computerized method of claim 7 further comprising executing at said computer for said multiple variable values regression testing and hypothesis testing.

13. A computerized system for calculating at least one statistic for a process comprising:
   (a) a server executing instructions to interact with a user device to:
      (1) display at said user device a data collection sheet to receive a plurality of data values for a process;
      (2) receive at said server a data entry selection to enter in said data collection sheet said plurality of data values;
      (3) receive at said server and enter in said data collection sheet said plurality of data values according to said user data entry;
      (4) receive at said server a user selection of a subset of said plurality of data values in said data collection sheet;
      (5) in response to receiving said user selection of said subset of said plurality of data values, present to said user and receive at said server a user selection of:
         (a) a first analysis prompt if said subset corresponds to a single column of said data collection sheet; and
         (b) a second analysis prompt if said subset corresponds to multiple columns of said data collection sheet;
      (6) in response to receiving at said server said user selection of said first analysis prompt or said second analysis prompt, prompting for and receiving from said user a plurality of additional input parameters corresponding to said user selections;
      (7) automatically select at said server a statistical analysis algorithm according to:
         (a) said subset of said plurality of data values; and
         (b) said additional input parameters;
      (8) execute at said server said statistical analysis algorithm to calculate at said computer at least one statistic for said subset of said plurality of data values; and
      (9) transmit from said server said at least one statistic; and
   (b) a user device that executes instructions to:
      (1) receive from said server said at least one statistic; and
      (2) generate at said user device a display comprising said at least one statistic.

14. The computerized system of claim 13 wherein said statistic is selected from the group consisting of:
   data average, data variation, and 95% confidence boundaries.

15. The computerized system of claim 13 wherein said server further executes instructions for a measured data algorithm to complete at least one statistical process control analysis.

16. The computerized system of claim 15 wherein said statistical process control analysis is a stability analysis.

17. The computerized system of claim 13 wherein said server further executes instructions for a measured data algorithm to complete at least one capability analysis.

18. The computerized system of claim 17 wherein said capability analysis comprises an out-of-specification percentage, a process repeatability statistic, a process precision statistic, and a process overall performance statistic.

* * * * *